United States Patent
Reed

(10) Patent No.: US 7,966,811 B2
(45) Date of Patent: Jun. 28, 2011

(54) EXHAUST TREATMENT SYSTEM HAVING A DIVERTER VALVE

(75) Inventor: James J. Reed, Yaxley (GB)

(73) Assignee: Perkins Engines Company Limited, Peterborough (GB)

( * ) Notice: Subject to any disclaimer, the term of this patent is extended or adjusted under 35 U.S.C. 154(b) by 789 days.

(21) Appl. No.: 11/947,838

(22) Filed: Nov. 30, 2007

(65) Prior Publication Data

US 2009/0139214 A1    Jun. 4, 2009

(51) Int. Cl.
*F01N 3/00*    (2006.01)
(52) U.S. Cl. ............... 60/286; 60/274; 60/295; 60/301; 60/303
(58) Field of Classification Search ............. 60/274, 60/286, 295, 301, 303
See application file for complete search history.

(56) References Cited

U.S. PATENT DOCUMENTS

| | | | |
|---|---|---|---|
| 4,102,127 A | 7/1978 | Saiki et al. | |
| 4,476,067 A | 10/1984 | Katou et al. | |
| 4,545,333 A * | 10/1985 | Nagumo et al. | 123/41.02 |
| 5,884,475 A | 3/1999 | Hofmann et al. | |
| 6,063,350 A | 5/2000 | Tarabulski et al. | |
| 6,301,879 B1 | 10/2001 | Weisweiler et al. | |
| 6,442,932 B1 | 9/2002 | Hofmann et al. | |
| 6,810,661 B2 * | 11/2004 | Lambert et al. | 60/286 |
| 6,837,041 B2 | 1/2005 | Hernier | |
| 6,845,612 B2 | 1/2005 | Jobson et al. | |
| 6,883,308 B2 | 4/2005 | Megas et al. | |
| 7,647,767 B2 * | 1/2010 | Osaku et al. | 60/286 |
| 2006/0051276 A1 | 3/2006 | Schaller et al. | |
| 2007/0084193 A1 | 4/2007 | Levin | |
| 2007/0092413 A1 | 4/2007 | Hirata et al. | |
| 2007/0163244 A1 | 7/2007 | Federle | |

FOREIGN PATENT DOCUMENTS

| | | |
|---|---|---|
| DE | 19827678 | 12/1999 |
| DE | 102005059581 | 6/2007 |
| EP | 1662103 | 5/2006 |
| EP | 1956207 | 8/2008 |
| FR | 2816986 | 5/2002 |
| JP | 1908931 | 4/2008 |
| WO | 2006064001 | 6/2006 |

* cited by examiner

*Primary Examiner* — Thomas E Denion
*Assistant Examiner* — Diem Tran
(74) *Attorney, Agent, or Firm* — Finnegan, Henderson, Farabow, Garrett & Dunner LLP

(57) ABSTRACT

An exhaust treatment system is provided having a tank configured to store a supply of reductant. The system also has a heat source configured to heat the reductant and a diverter valve configured to regulate the heat source.

21 Claims, 2 Drawing Sheets

EXHAUST TREATMENT SYSTEM HAVING A DIVERTER VALVE

TECHNICAL FIELD

The present disclosure is directed to an exhaust treatment system, and more particularly, to an exhaust treatment system having a diverter valve.

BACKGROUND

Internal combustion engines, including diesel, gasoline, gaseous fuel, biofuel and other engines known in the art, exhaust a complex mixture of air pollutants. These air pollutants are composed of gaseous compounds, such as, for example, oxides of nitrogen (NOx). Due to increased environmental awareness, more stringent regulations now limit NOx emissions based on engine type, size, and class.

Engine manufacturers can use Selective Catalytic Reduction (SCR) to reduce emission levels of some air pollutants. SCR operates by adding a gaseous or liquid reductant, often urea, to an engine's exhaust gas upstream of a catalyst. Reductant can react with NOx on the catalyst to form $H_2O$ and $N_2$, thereby lowering NOx emissions.

Although SCR can reduce emission levels, reductant storage can be problematic at cold or hot temperatures. For example, urea typically freezes at about −10° C. and can degrade above about 60° C. Traditionally, an electric heater can be used to thaw frozen urea. To prevent overheating, urea storage tanks can be placed away from heat sources, such as, engine blocks or exhaust systems. However, temperature sensors, processors, or other control mechanisms are required to maintain urea within a suitable temperature range.

One system designed to maintain reductant temperature within a suitable range is described in U.S. Patent Application Publication No. 2007/0092413 (hereinafter "the '413 publication") of Hirata et al., published on Apr. 26, 2007. The '413 publication discloses a reducing agent heating system, wherein the reducing agent is injected into an exhaust stream to reduce NOx emissions. The heating system uses heat supplied by a flow of engine coolant, and a heat exchanger transfers heat from the coolant fluid to an injection nozzle or tubing containing the reducing agent. A processor coupled to temperature sensors controls coolant flow via an electronic valve, maintaining the reducing agent's temperature within an appropriate range.

The temperature control system of the '413 publication is complex and expensive. The injection nozzle or tubing must be modified to accommodate a heat exchanger, temperature sensors are required at various locations, and additional computational processing is required to monitor temperatures and regulate coolant flow via the electronic valve. Failure of a single component could freeze or overheat the reducing agent.

The present disclosure is directed at overcoming one or more of the limitations in the prior art.

SUMMARY OF THE INVENTION

One aspect of the present disclosure is directed to an exhaust treatment system. The exhaust treatment system can include a tank configured to store a supply of reductant. The system can also include a heat source configured to heat the reductant and a diverter valve configured to regulate the heat source.

Another aspect of the present disclosure is directed to a method of regulating a temperature of a reductant. The method can include providing a supply of reductant. Further, the method can include regulating a heat source using a diverter valve, wherein the heat source can be configured to transfer heat to the supply of reductant and the diverter valve can be temperature actuated.

A third aspect of the present disclosure is directed to a power system. The power system can include an engine and an exhaust system configured to receive a flow of exhaust gas from the engine. The power system can further include a tank configured to store a supply of reductant and an injector fluidly connected to the tank and configured to inject the reductant into the flow of exhaust gas. Also, the power system can include a heat source configured to heat the reductant and a diverter valve configured to regulate the heat source.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system.

DETAILED DESCRIPTION

Figure 1:
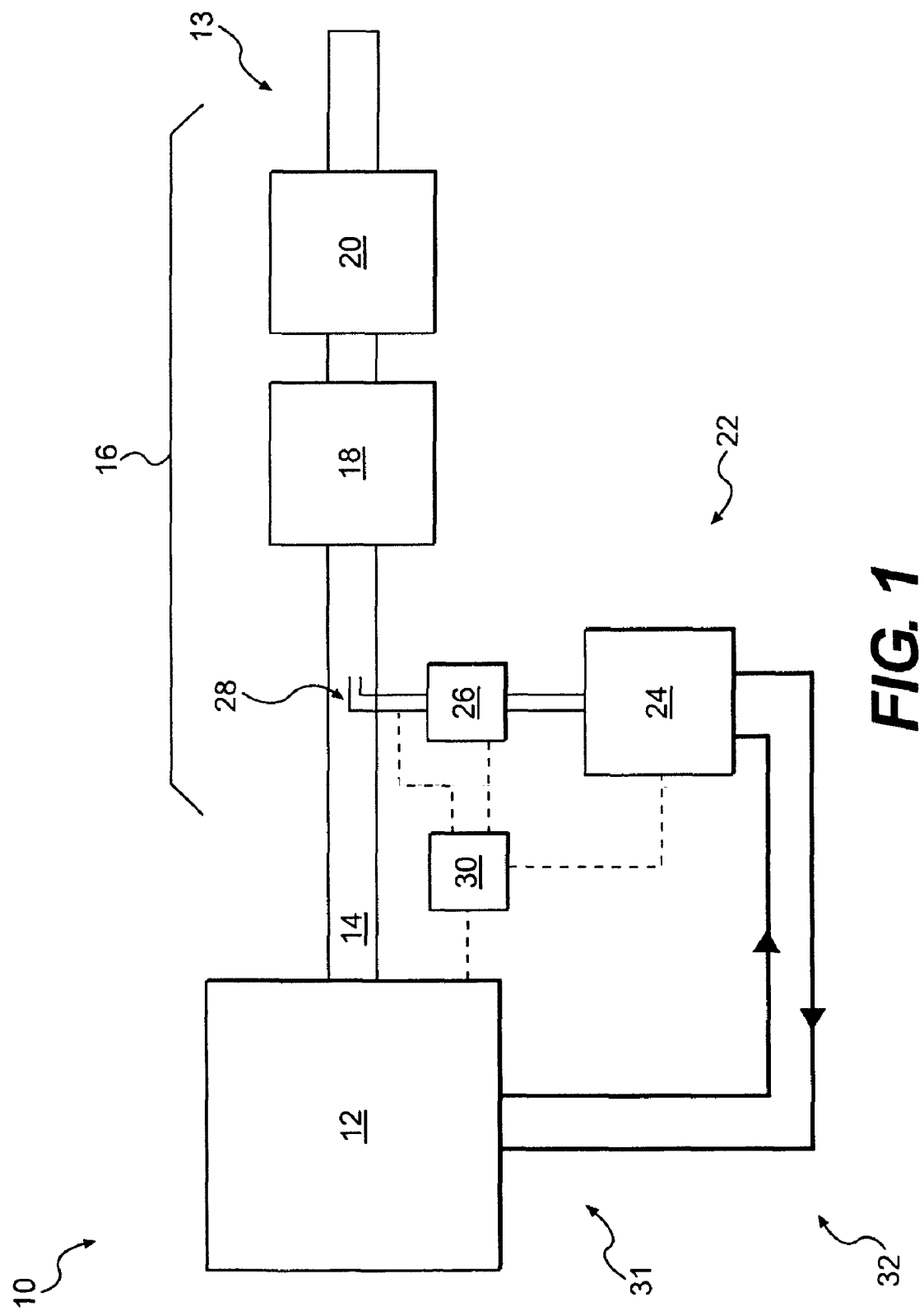
FIG. 1 is a diagrammatic illustration of a power system, according to an exemplary disclosed embodiment.

FIG. 1 illustrates a power system 10, according to an exemplary disclosed embodiment. Power system 10 can include any device or system configured to produce mechanical or electrical power. For example, power system 10 may be configured to provide power to an on-highway vehicle, construction or mining equipment, or a factory or power plant. Power system 10 could be configured to operate with any suitable mobile or stationary machine requiring power.

As shown in FIG. 1, power system 10 can include a power source 12 and an exhaust system 13. Power source 12 may include a diesel engine, a gasoline engine, a gaseous fuel-powered engine, biofuel engine, or any other engine known in the art. Power source 12 may also include a plurality of combustion chambers (not shown), wherein each combustion chamber can be configured to combust a mixture of fuel and air to produce power.

Exhaust gases are also produced by the combustion process. To reduce emission levels of unwanted pollutants, these exhaust gases may be mixed with a reductant. In order to avoid freezing or degradation, the reductant's temperature should be maintained within a suitable range, as described below by reference to the system and method of the present disclosure.

Exhaust system 13 can include any system configured to receive exhaust gases produced by power source 12, such as, for example, one or more exhaust passages 14. Exhaust passage 14 can include any suitable conduit fluidly connected to power source 12 and may be configured to receive exhaust gas produced by one or more combustion chambers. To reduce exhaust gas emissions, exhaust passage 14 can be fluidly connected to one or more exhaust treatment systems 16.

Exhaust treatment system 16 can be configured to at least partially remove various combustion products contained within an exhaust gas. For example, exhaust treatment system 16 can include one or more devices configured to treat a flow of exhaust gas produced by power source 12. Unwanted gases or particulate matter can be at least partially removed from the exhaust gas using exhaust treatment system 16, such as, for example, a catalyst 18 or a filter 20. In some embodiments, catalyst 18 or particulate filter 20 may be fluidly connected to exhaust passage 14 and disposed within a flow of exhaust gas. Although exhaust treatment system 16 is shown with a single catalyst 18 and a single filter 20, exhaust treatment system 16 may include only one catalyst 18 or filter 20, or more than one of either or both catalyst 18 and filter 20.

Catalyst 18 can include any suitable catalytic material configured to convert one or more constituents of the exhaust gas into a more environmentally acceptable gas or compound. Harmful constituents can be converted via any suitable chemical reaction, such as, for example, oxidation or reduction. Catalyst 18 can be configured to facilitate various reactions, such as, for example, selective catalytic reduction (SCR), or adsorption of nitrous oxides (NOx). Catalyst 18 can also include an oxidation catalyst, such as, for example, a diesel oxidation catalyst. The oxidation catalyst can convert hydrocarbons, carbon monoxide or NOx into less noxious products. Such a catalyst may include any suitable catalytic material, such as, for example, platinum, aluminum, palladium, rhodium, barium, cerium, alkali metals, alkaline-earth metals, rare-earth metals, or combinations thereof.

Filter 20 can include a variety of designs, materials, or structures configured to capture particulate matter by physical filtration. For example, filter 20 can include any type of trap or similar device configured to retain various solid combustion products produced by power source 12, such as, soot, ash, or unburned hydrocarbons. Filter 20 can also include a diesel particulate filter or a partial filter designed to trap, for example, about 60% of particulate matter.

Filter 20 can include a filter medium configured to trap particulate matter contained in the exhaust gas. The filter medium may include a mesh-like material, a porous ceramic material, fiber mats, or any other material or configuration suitable for trapping particulate matter. Particulate filter 20 can be manufactured from a variety of materials including cordierite, silicon carbide, and other high temperature oxide ceramics.

Exhaust treatment system 16 can also include a combination device (not shown) containing features of catalyst 18 and filter 20. For example, such a combination device may include one or more catalytic particulate filters, which may include a catalytic material integral with a filter medium. Specifically, catalyst 18 may be packaged with, coated on, or otherwise associated with the medium of filter 20 such that the filter medium may be at least partially formed from a catalytic material.

Exhaust treatment system 16 may also include a reductant system 22. Reductant system 22 can be configured to store any suitable reductant, such as, for example, urea, ammonia, or Adblue®. Reductant system 22 may also be configured to inject a reductant into exhaust passage 14. For example, a reductant may be injected into exhaust passage 14 upstream of catalyst 18 or filter 20. In one example, urea may be injected into exhaust passage 14 to react with NOx on catalyst 18 to reduce NOx emission levels.

Reductant system 22 can include one or more storage tanks 24, configured to store a supply of reductant. Reductant system 22 can also include a pump 26 configured to pump the reductant from tank 24, although pump 26 may not be required if reductant can be pumped by pressure, gravity, or other methods. Further, reductant system 22 can include an injector 28 configured to inject the reductant into exhaust passage 14. Injector 28 can be fluidly connected to tank 24 or any component of reductant system 22 containing reductant. Injector 28 can include a nozzle, opening, or otherwise be configured to mix reductant in liquid, vapor, or gas form with a flow of exhaust gas.

Reductant system 22 may also include multiple components to retain, condition, direct, and inject the reductant into exhaust passage 14. For example, reductant system 22 may include a secondary storage tank (not shown), sensor (not shown), or other components known to one skilled in the art. One or more valves (not shown) may also be associated with reductant system 22 to regulate reductant flow. Reductant system 22 may be configured to withstand cold and hot temperatures. For example, reductant system 22 may be covered with a thermal insulator to aid heat retention.

To reduce emission levels, reductant may be injected into a flow of exhaust produced by power source 12 at any suitable flow rate, timing, or concentration. Reductant injection may be controlled by a controller 30, wherein controller 30 may control the operation of one or more components of reductant system 22. Controller 30 may be operably associated with power source 12 or one or more components of exhaust treatment system 16. Specifically, controller 30 may monitor power source 12, monitor one or more properties of a reductant in tank 24, control pump 26, monitor a flow of reductant from tank 24 to injector 28, or control injector 28.

Controller 30 may embody a single microprocessor or multiple microprocessors configured to control an operation of one or more exhaust treatment systems 16. Various commercially available microprocessors can be configured to perform the functions of controller 30. As such, controller 30 could include a general machine or power unit microprocessor capable of controlling numerous machine or engine functions. Controller 30 may further include other electrical components (not shown), such as, for example, a memory, a storage device, or a processor. Various other known circuits may be associated with controller 30, including power supply circuitry, signal-conditioning circuitry, solenoid driver circuitry, or communication circuitry.

Periodic reductant heating or cooling may be required to maintain a reductant within a suitable temperature range. For example, urea can partially freeze at temperatures below about −10° C. and at least partially degrade at temperatures greater than about 60° C. Other reductants may similarly require storage within a suitable temperature range to reduce freezing or degradation.

In some embodiments, a heat source 31 can be regulated to maintain a reductant within a suitable temperature range. Heat source 31 can include any system configured to produce or absorb heat. For example, power source 12 could be configured to supply heat. Specifically, power source 12 could be operably associated with reductant source 22 and configured to provide energy to reductant system 22. Reductant system 22 could also be supplied with heat by electrical heating, chemical heating, or any other methods known in the art.

As shown in FIG. 1, power source 12 could be configured to provide a fluid flow to reductant system 22. In particular, heated fluid could flow from power source 12 to one or more components of reductant system 22 via one or more supply lines 32. Supply lines 32 may be tubular hoses or any other suitable lines configured to pass a fluid therein. A heated fluid flow from power source 12 could flow into tank 24 via supply lines 32 to heat a supply of reductant stored in tank 24. Fluid flow from power source 12, or any other suitable source, could also be configured to supply heat to pump 26, injector 28, or any other component of reductant system 22.

Figure 2:
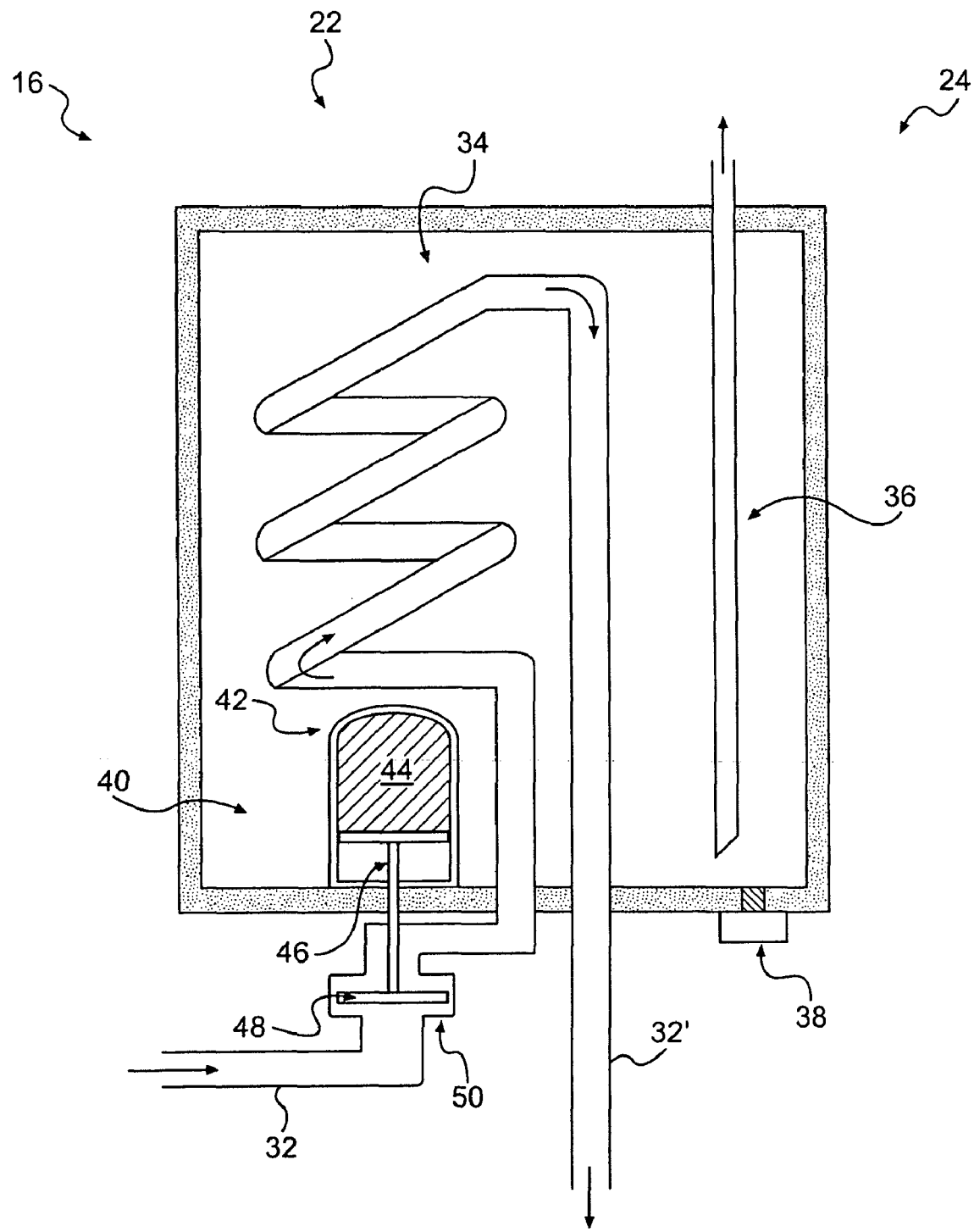
FIG. 2 is a diagrammatic illustration of an exhaust treatment system, according to an exemplary disclosed embodiment.

FIG. 2 illustrates an exemplary disclosed embodiment of exhaust treatment system 16. Exhaust treatment system 16 can be associated with an input supply line 32 and an output supply line 32'. Input supply line 32 can be configured to provide an input of fluid flow to reductant system 22 and output supply line 32' can be configured to provide an output of fluid flow from reductant system 22. Supply lines 32, 32' could be configured to receive any fluid flow from any suitable energy source, such as, for example, power source 12. In some embodiments, supply lines 32, 32' could be configured to receive an engine coolant flow from power source 12.

As shown in FIG. 2, supply lines 32, 32' can be partially positioned within tank 24. In other embodiments, supply lines 32, 32' may flow around or adjacent to tank 24. Supply lines 32, 32' may be configured to transfer energy to tank 24 using various configurations, such as, for example, a helical configuration as shown in FIG. 2. Further, supply lines 32, 32' may be configured to heat a secondary tank (not shown), a pump (not shown), an injector (not shown), or any other component of reductant system 22.

Tank 24 may include a region 34 configured to store a supply of reductant, such as, for example, urea. Region 34 may be any suitable volume depending on the amount of reductant required. Tank 24 may also include a pick-up pipe 36, configured to pipe reductant from tank 24 to another component of reductant system 22, such as, for example, an injector (not shown). Tank 24 may also include a drain valve 38, configured or positioned to permit periodic draining or refilling of tank 24.

Tank 24 may also include a diverter valve 40. Diverter valve 40 can include any valve configured to regulate a fluid flow. For example, diverter valve 40 may be configured to at least partially divert a fluid flow, whereby a fluid flow can be diverted to two or more conduits. Diverter valve 40 can also include a blanking valve, or similar device, configured to at least partially reduce a fluid flow from a single input line to a single output line.

Diverter valve 40 can be a temperature actuated valve, wherein diverter valve 40 can be configured to actuate based on a temperature input. In particular, diverter valve 40 can be configured to receive an input of thermal energy and actuate an output based on the thermal energy input. As such, diverter valve 40 can regulate a reductant's temperature without any electrical components, such as, for example, sensors, controllers, or electrical valves.

In some embodiments, diverter valve 40 could be configured to actuate at an approximate temperature, or within a range of approximate temperatures. For example, diverter valve 40 could be configured to actuate at about −10° C. or about 60° C. Specifically, diverter valve 40 may at least partially open or at least partially close at about −10° C., about 60° C., or at any temperature between about −10° C. and about 60° C. In some embodiments, diverter valve 40 may actuate at about −20° C. or about 70° C. Diverter valve 40 could also be configured to actuate at any suitable temperature or any suitable temperature range, depending on the reductant stored in tank 24.

Diverter valve 40 may include a valve casing 42, a chamber 44, and a push-rod 46. Valve casing 42 can be configured to receive energy from a reductant, such as, for example, a supply of reductant in region 34. Casing 42 may further include baffles (not shown), or other components configured to aid energy transfer between the supply of reductant and valve casing 42, or valve casing 42 and chamber 44.

Chamber 44 can be configured to receive energy from valve casing 42. In some embodiments, chamber 44 can include wax, or similar two-phase material configured to undergo a phase change. Such a phase change can operate to actuate diverter valve 40 at a suitable temperature. Wax, or similar material, can be selected to undergo a phase change, expand, or contract at a suitable temperature or within a suitable temperature range.

Diverter valve 40 can also include one or more push-rods 46. Push-rod 46 can be operably associated with chamber 44, whereby expansion or contraction of chamber 44 can move push-rod 46. As shown in FIG. 2, expansion of chamber 44 could move push-rod 46 down while contraction of chamber 44 could move push-rod 46 up.

Push-rod 46 could also be configured to at least partially regulate a fluid flow. For example, push-rod 46 could regulate a fluid flow by actuating a valve member 48 within a valve seat 50. In some embodiments, push-rod 46 can be physically connected to valve member 48. In other embodiments, push-rod 46 can be operably associated with valve member 48 via mechanical or electrical systems, such as, for example, a rod, a pulley, a wire, a gear, an electric motor, a solenoid, or similar system. Diverter valve 40 could also include other components operably associated with chamber 44 and configured to regulate a fluid flow.

Movement of valve member 48 within valve seat 50 may regulate fluid flow with supply lines 32, 32'. As shown in FIG. 2, valve member 48 may move up or down to slow a fluid flow within supply line 32. Valve member 48 may also move to an upper or lower position to sealing contact valve seat 50, thereby inhibiting fluid flow in supply line 32. Other configurations of valve member 48, valve seat 50, or supply lines 32, 32' may be readily used to regulate fluid flow.

In other embodiments, chamber 44 can be an expandable hermetic chamber. Expandable hermetic chamber 44 can include a sealed chamber containing a solid, liquid, or gas configured to expand or contract at different temperatures or temperature ranges. Similar to the above mentioned wax valve embodiment, expandable hermetic chamber 44 can be operably associated with push-rod 46 to actuate a fluid flow. In yet other embodiments, reductant system 22 could include a plurality of diverter valves 40 configured to regulate reductant temperature.

INDUSTRIAL APPLICABILITY

The present disclosure provides a system and method for regulating a temperature of a reductant stored within reductant system 22. Reductant system 22 may be configured to operate with a variety of power sources 12 and exhaust systems 13 to provide an efficient method for reducing reductant freezing or overheating. Reductant system 22 can include diverter valve 40, wherein diverter valve 40 can be configured to actuate at different temperatures to generally maintain the reductant within a suitable temperature range. Diverter valve 40 can be simple, inexpensive, and configured to operate without electrical components.

In operation, fuel and air may combust within power source 12 to provide power and a flow of exhaust gas. The exhaust gas may contain a complex mixture of air pollutants that can include NOx. As exhaust gas flows through exhaust passage 14, NOx within the exhaust gas may be reduced by a chemical reduction process. Specifically, reductant may be sprayed via injector 28 into the exhaust gas flow. The combined mixture of exhaust gas and reductant may then pass downstream to catalyst 18, where the reductant may convert at least a portion of the NOx to $N_2$ and $H_2O$. The reduced exhaust gas may then be filtered through filter 20 and released to the atmosphere.

Reductant system 22 provides an improved system and method for regulating reductant temperature. Traditional reductant systems often required electrical heaters, controllers, sensors, or other components to manage reductant temperature. The present disclosure provides a less complicated and less costly system to maintain reductant temperature.

In some embodiments, reductant system 22 may be configured to generally maintain the temperature of urea between about −10° C. and about 60° C. By way of example, chamber 44 could contain a wax material configured to undergo a phase change at about −10° C. or about 60° C. Initially, urea in region 34 may be cold and require heating. Valve 40 may be configured to permit a flow of heated fluid through tank 24, thereby heating the urea. As the temperature of the urea rises, heat may be transferred to chamber 44. At about 60° C., diverter valve 40 may inhibit the flow of heated fluid by moving valve member 48 down into sealing contact with valve seat 50. Movement of valve member 48 may be effected by expansion of chamber 44. Wax in chamber 44 may expand due to heat absorbed from the reductant and casing 42.

Following actuation of diverter valve 40 at about 60° C., heated fluid flow within supply lines 32, 32' may reduce. Reduced fluid flow results in less heat transfer to the reductant in tank 24. Eventually, the reductant in tank 24 may cool to a point when additional heating may be required.

In some embodiments, diverter valve 40 may be configured to gradually increase fluid flow or diverter valve 40 may be actuated to increase fluid flow at a desired temperature. For example, diverter valve 40 may gradually open as the temperature of reductant reaches about −10° C., or valve 40 may actuate at about −10° C., opening the heated fluid flow. Reductant heating will follow resumption of fluid flow within supply lines 32, 32', and the heating of tank 24 will start again. Such a self-contained feedback process can ensure a reductant remains within an adequate temperature range.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. An exhaust treatment system, comprising:
a tank configured to store a supply of reductant;
a heat source configured to heat the reductant; and
a diverter valve configured to regulate the heat source, wherein at least a portion of the diverter valve is disposed within the tank and is configured to actuate a valve member of the diverter valve by expanding and contracting in response to heat transfer between the portion of the diverter valve in the tank and the reductant in the tank.

2. The exhaust treatment system of claim 1, wherein the portion of the diverter valve that is disposed within the tank is configured to actuate the valve member at a temperature of at least one of about −10° C. or about 60° C.

3. The exhaust treatment system of claim 1, wherein the portion of the diverter valve that is disposed within the tank includes wax that expands and contracts in response to heat exchange with the reductant in the tank.

4. The exhaust treatment system of claim 1, wherein the portion of the diverter valve that is disposed within the tank includes a phase change material.

5. The exhaust treatment system of claim 1, wherein the at least a portion of the diverter valve that is disposed within the tank and is configured to actuate a valve member of the diverter valve includes an expandable hermetic chamber.

6. The exhaust treatment system of claim 1, further including an injector fluidly connected to the tank and configured to inject the reductant into an exhaust stream.

7. The exhaust treatment system of claim 1, wherein the heat source is a fluid flow.

8. The exhaust treatment system of claim 7, wherein the fluid flow is an engine coolant flow.

9. The exhaust treatment system of claim 1, wherein at least a portion of the valve member of the diverter valve is disposed outside of the tank.

10. A method of regulating a temperature of a reductant, comprising:
providing a supply of reductant; and
regulating a heat source using a diverter valve, wherein the heat source is configured to transfer heat to the supply of reductant and at least a portion of the diverter valve is in contact with the reductant and is configured to actuate a valve member of the diverter valve by expanding and contracting in response to heat transfer between the reductant and the portion of the diverter valve in contact with the reductant.

11. The method of claim 10, wherein the portion of the diverter valve that is in contact with the reductant is configured to actuate the valve member of the diverter valve at a temperature of at least one of about −10° C. or about 60° C.

12. The method of claim 10, wherein the portion of the diverter valve that is in contact with the reductant includes wax that expands and contracts in response to heat exchange with the reductant in the tank.

13. The method of claim 10, wherein the portion of the diverter valve that is in contact with the reductant includes a phase change material.

14. The method of claim 10, wherein the portion of the diverter valve that is in contact with the reductant includes an expandable hermetic chamber.

15. The method of claim 10, wherein the heat source is a fluid flow.

16. The method of claim 10, further including injecting the reductant into an exhaust stream.

17. A power system, comprising:
an engine;
an exhaust system configured to receive a flow of exhaust gas from the engine;
a tank configured to store a supply of reductant;
an injector fluidly connected to the tank and configured to inject the reductant into the flow of exhaust gas;
a heat source configured to heat the reductant; and
a diverter valve configured to regulate the heat source, wherein at least a portion of the diverter valve is disposed within the tank and is configured to actuate a valve member of the diverter valve by expanding and contracting in response to heat transfer between the portion of the diverter valve in the tank and the reductant in the tank.

18. The power system of claim 17, wherein the portion of the diverter valve that is disposed within the tank is configured to actuate the valve member at a temperature of at least one of about −10° C. or about 60° C.

19. The power system of claim 17, wherein the exhaust system includes at least one of a catalyst and a filter.

20. The power system of claim 17, wherein the portion of the diverter valve that is disposed within the tank includes wax that expands and contracts in response to heat exchange with the reductant in the tank.

21. The power system of claim 17, wherein the heat source includes a fluid flow from the engine.

* * * * *